Aug. 7, 1962 O. C. CATALDO 3,048,828

MEMORY DEVICE

Filed Oct. 12, 1959 2 Sheets-Sheet 1

INVENTOR.
OTTAVIO C. CATALDO
BY
Raymond A. Paquin
ATTORNEY.

Aug. 7, 1962 O. C. CATALDO 3,048,828

MEMORY DEVICE

Filed Oct. 12, 1959 2 Sheets-Sheet 2

INVENTOR.
OTTAVIO C. CATALDO
BY
Raymond A. Paquin
ATTORNEY.

3,048,828

MEMORY DEVICE

Ottavio C. Cataldo, Suffolk, N.Y., assignor to American Bosch Arma Corporation, a corporation of New York Filed Oct. 12, 1959, Ser. No. 846,034
4 Claims. (Cl. 340—174)

The present invention relates to magnetic memory devices and has particularly reference to means for obtaining desired magnetic states in multiapertured ferrite cores.

Digital memory devices using ferrite cores are not new in the art. In general, a pair of wires pierce a hole in a ferrite disc about which magnetic states are set up so that a pulse in one of the wires will either reverse the flux (and permit it to be resored in the original direction) or will not affect the magnetic field (due to magnetic saturation of the core material on both sides of the hole in the same direction). A voltage will be induced in the other wire when the field is reversed, while no voltage is induced when the field is not reversed. This characteristic is used to represent "ones" and "zeros" in binary magnetic memory devices.

The improvement provided by the present invention lies in the method and apparatus for providing the desired magnetic states in the cores.

In prior art devices a ferrite disc having a pair of holes, informally identified as a large hole and a small hole, is threaded by at least one wire in the large hole, and driver and sensor wires in the small hole. By applying selected current pulses in the wire through the large hole the flux around the small hole may be set to either a "core" or "zero" state such as those described earlier. The selected current, however, must be closely regulated in amplitude and must be capable of reversal.

In the present invention, a system of flux cancellation about the small hole is used to write in a zero. This is accomplished by threading one (the prime) wire through both the large and small holes and a driver wire through the small hole only. A "one" state is set up in an erased core by a current pulse through the prime wire while a "zero" state is set up by current pulses in both the prime wire and driver wire. After reading of the core it is reset by a current pulse in the prime wire.

Flux cancellation as a means for establishing desired magnetic states in ferrite cores has been proposed in the past but these methods have resulted in a destructive memory, i.e., one in which the stored information is destroyed upon read out, and cannot be reset by a priming pulse. The present invention however provides a nondestructive memory, i.e., one which retains its information after having been read.

For a more complete understanding of the invention, reference may be had to the accompanying diagrams, in which, FIG. 1 shows a prior art ferrite core in a blocked state;

Figures 1, 2, 3, 4, 5, 6, 7, 8:
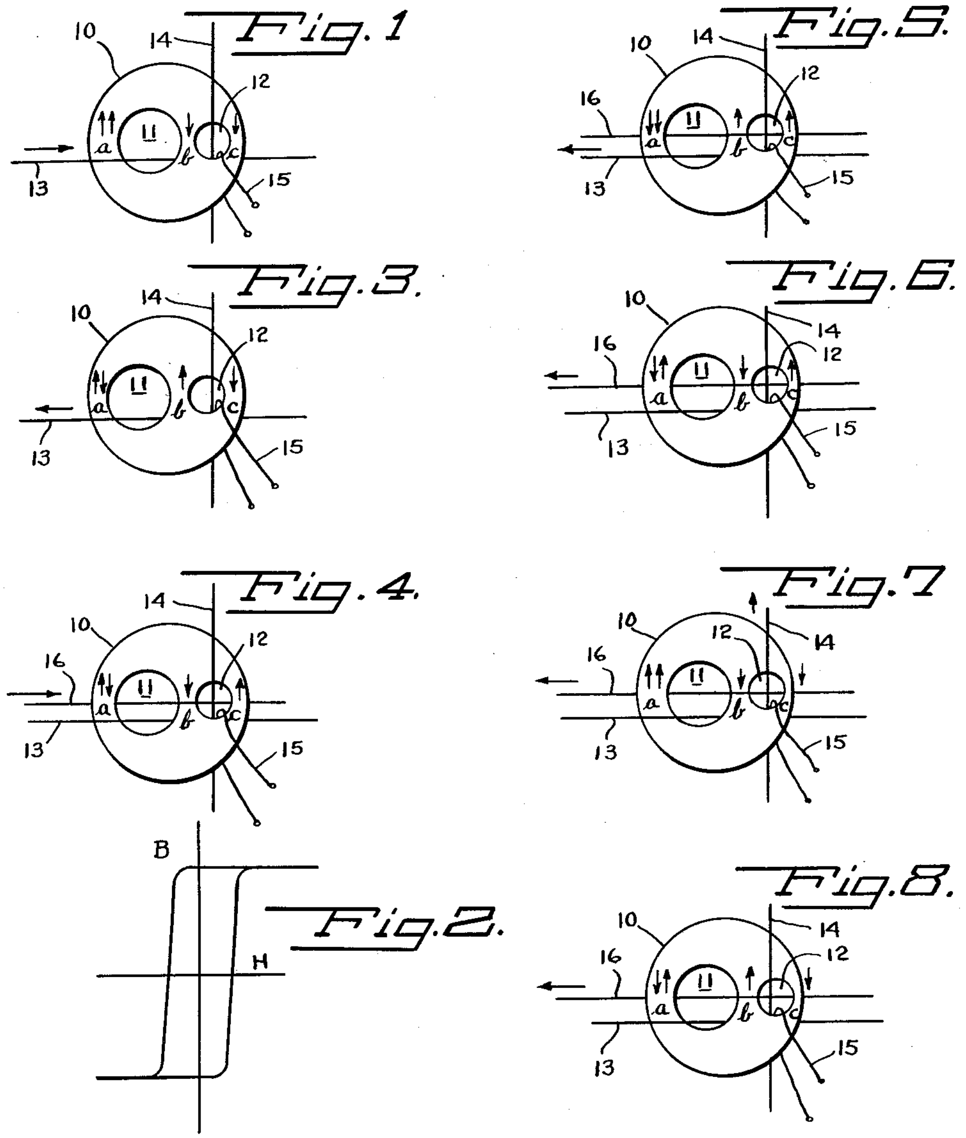
FIG. 2 illustrates the hysteresis characteristic of the prior art ferrite core.
FIG. 3 shows a ferrite core in the "one" state after readout.
FIG. 4 shows a prior art ferrite core in the state before readout.
FIG. 5 shows a ferrite core of this invention in the erased state.
FIG. 6 shows a ferrite core in the "one" state.
FIG. 7 shows a ferrite core in the "zero" state.
FIG. 8 shows a ferrite core after readout.

Referring to FIGURE 1, the theory of the multiapertured core will be explained to assist in the understanding of the present invention.

The multiapertured core is made of a disc 10, of ferrite which has a rectangular hysteresis loop such as shown in FIG. 2. Three legs, *a*, *b* and *c* are formed in this disc by the two holes 11 and 12. The large hole 11 leaves one leg *a* between the hole and the edge of the disc and the smaller hole 12 produces a pair of legs *b* and *c* between the hole 12 and the edge of hole 11 and the edge of disc 10 respectively. The area of the leg *a* is greater than the combined area of legs *b* and *c*.

In prior art a wire 13 is threaded through hole 11, and a current pulse in the direction of the arrow through wire 13, sets up magnetic flux vectors in the direction of the arrows through legs *a*, *b* and *c*. The current is of magnitude sufficient to saturate the legs *b* and *c*. These legs remain saturated upon removal of the current because of the rectangular hysteresis characteristic of the core 10. A pair of wires 14 and 15 are threaded through hole 12. A driving pulse through wire 14, in either direction, can cause no effect in sensing wire 15 since the saturated legs *b* and *c* will not permit a change in their magnetic state in response to current in wire 14. The core is therefore in the "blocked" or "zero" state.

The core is set to a one state (as shown by FIG. 3) by reversing the remanent flux in leg *b* only while leg *c* remains saturated in the original direction. This may be accomplished by putting a reverse current pulse through wire 13 of such magnitude that its effective magnetic field reaches only as far as hole 12. The core of FIG. 3 is known as a one-set core, or a one core which has been read.

The core of FIG. 3 is "primed" or "reset" to the proper condition for readout by reversing the flux about hole 12 as shown in FIG. 4, and is accomplished by sending a pulse through a prime wire 16 which threads both holes 11 and 12. The prime pulse is of the proper direction to reverse the flux pattern of FIG. 3 about hole 12 of those cores which are set to one but does not affect the flux pattern of blocked cores, or those cores which are set to zero (FIG. 1).

Now, with respect to the primed core of FIG. 4, a positive pulse through wire 14, which creates a clockwise magnetic field around hole 12 will reverse the flux through leg *c* and around hole 12 and by induction will create an electrical pulse in sensing wire 15 resulting in a "read" core having flux directions as shown in FIG. 3. The core is reset to one by a pulse through a prime wire 16 which threads both holes 11 and 12.

Reviewing the above, the core is first blocked by a pulse in wire 13, is written into with "ones" by a negative current pulse, or is left blocked for "zero" state, is then primed for readout and is finally read by pulses in the wire 14. The cores are reset by pulses in the prime wire 16 after readout.

In distinction to the above, the present invention, although accomplishing the same purpose does it in a more advantageous manner as follows: The core is erased to a "reversed" blocked state, a "one" is set in by a pulse through the prime wire which threads both holes simultaneously, while a zero is set in a flux cancellation around the smaller hole with a driver pulse, coincident with the prime pulse.

FIGURE 5 shows the multiapertured core 10 similar to that in FIG. 1 through which a prime wire 16 has been added as in FIG. 4. The wire 16 passes through both holes 11 and 12. The flux vectors are initially set up as shown in FIG. 5 (opposite to FIG. 1) by an "erase" pulse through wire 13 of proper polarity. The core 10 is set to "one" by sending a current pulse through the wire 16. It will be seen that the direction of this pulse must be such as to set up a clock-wise field about hole 11 and a counterclockwise field about hole 12. The flux in leg *b* therefore will be reversed while the flux in leg *c* remains the same as in the erased condition.

In order to set the core of FIG. 5 to zero, a pulse is applied to wire 14 in coincidence with that in wire 16 in such a fashion that their combined effect around hole 12 is a magnetic flux cancellation. Thus the only effect experienced by the core 10 is a magnetization according to the current pulse in the wire 16 through hole 11, i.e., clockwise flux through the entire core 10, resulting in a flux distribution as shown in FIG. 7 which corresponds to the blocked core of FIG. 1. This is now a "zero" set core, corresponding to a reversal of the flux of that in the erased core of FIG. 5.

In the process of readout, a driver pulse is sent through wire 14 and reverses the flux about the small holes of the one set cores (FIG. 6) to induce a voltage pulse in the wire 15, but does not affect the flux distribution about the small hole of zero set cores (FIG. 7).

After readout, the flux distribution of the one-set cores appears as shown in FIG. 8. A prime or reset pulse through wire 16 resets the core from the condition of FIG. 8 to the condition of FIG. 6.

The advantage of the arrangement of FIGS. 5 through 8 will become apparent when a matrix of cores is assembled for a digital memory circuit. A matrix of this type is shown in FIG. 9.

Figure 9:
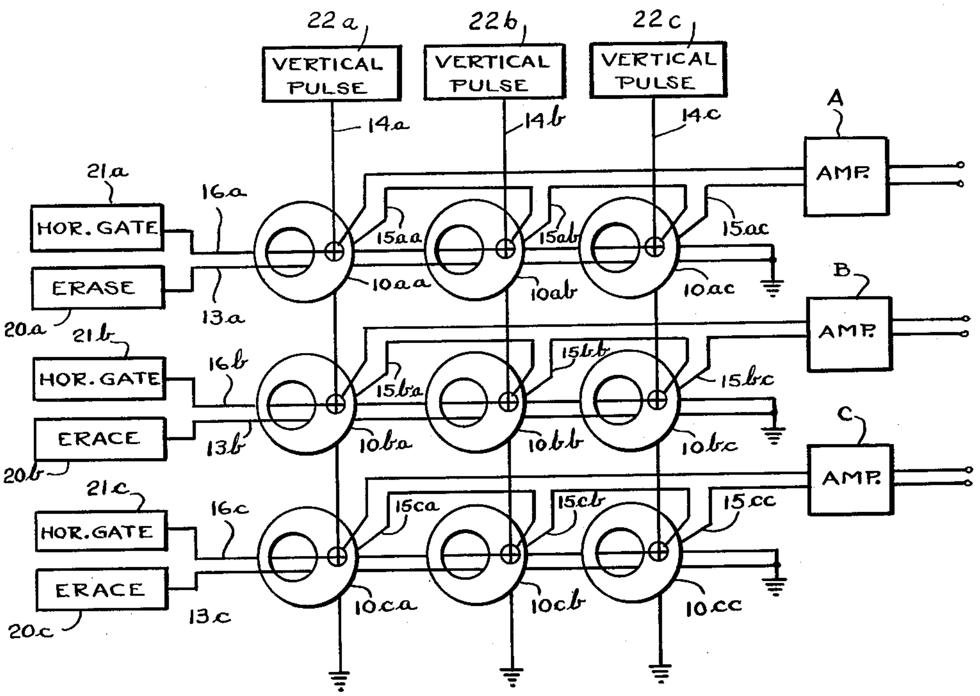
FIG. 9 shows a matrix of cores wired according to this invention.

The matrix of FIG. 9 contains three rows and three columns of ferrite discs 10 in which vertical pulse driver wire **14*a* threads the small holes 12 in the discs of the first column, wire 14*b* threads the small holes 12 in the discs of the second column and wire 14*c* threads the small holes 12** in the discs of the third column.

Similarly, the horizontal gate or prime wire **16*a* threads both holes of the discs in the top row, horizontal gate or prime wire 16*b* threads both holes of the discs in the middle row and horizontal gate wire 16*c*** threads both holes of the discs in the bottom row.

Although a 3x3 matrix has been shown, it should be obvious that a matrix of any number of columns and rows may be constructed in this fashion.

An erase wire threads all of the large holes in all of the discs, either as separate erase wires **12*a*, 13*b*, 13*c*, as shown, each energized by separate erase gates 20*a*, 20*b*, 20*c*** or by a single erase wire (not shown) energized from one erase gate.

In operation of the matrix of FIG. 9, the discs 10 are all erased initially to the condition of FIG. 5 by current pulse through the wires **13*a*, 13*b* and 13*c***.

During the write-in period when the constants are inserted into the matrix, the constants are first set into the top row, then the middle row and finally the bottom row, for example. Thus the horizontal gate **21*a* emits a current pulse into wire 16*a* and during that pulse a vertical pulse is set into each vertical wire 14*a*, 14*b* and 14*c* from pulse sources 22*a*, 22*b* and 22*c***, respectively for those discs of the top row which are to be set to "zero," all other discs being set to "one" by the horizontal gate pulse alone.

Figure 10:
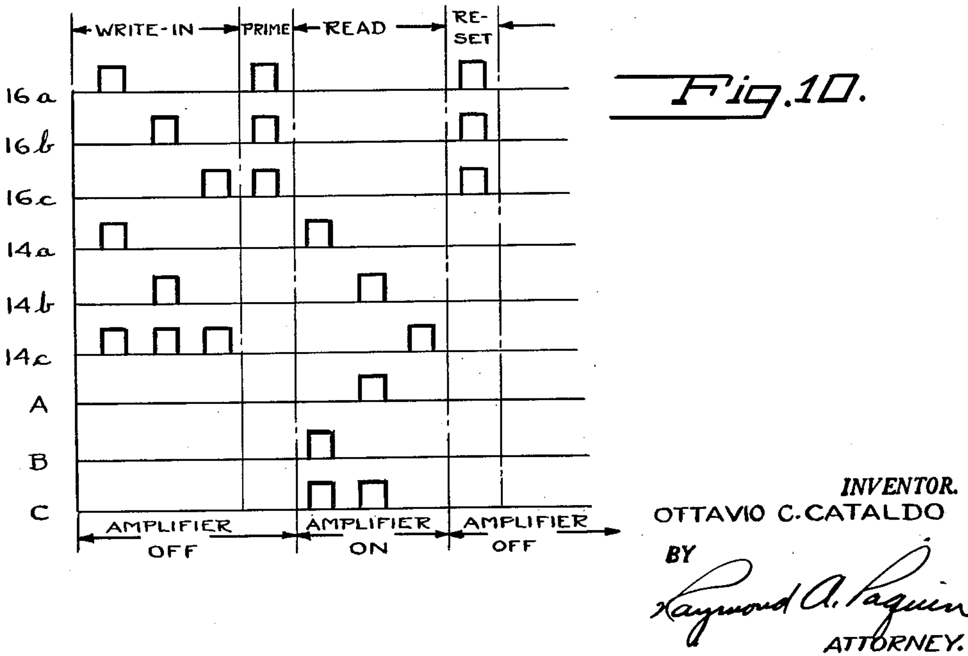
FIG. 10 illustrates a typical cycle of pulses required for write in, readout and reset of the matrix of FIG. 9.

Thus, if the pulses in FIG. 10 represents energization of the wires **14*a***, *b*, *c* and **16*a***, *b*, *c*, then will be seen that during the write-in period while **16*a* is energized coincident pulses on wires 14*a* and 14*c*** will write the constant 010 into the discs on row one.

During the pulse on **16*b* of the write-in period coincident pulses on wires 14*b* and 14*c* will write in zero's on the right-hand discs resulting in a stored constant of 100. It will be seen that the pulse in 14*b* will convert the flux distribution in the disc 10*a***, *b* from that of FIG. 6 into that of FIG. 8. However, this will not be disadvantageous as will be shown.

The constant 110 is set into the bottom row by energizing wires **16*c* and 14*c* simultaneously. The pulse in 14*c*** does not affect the discs in the upper rows since they have been set to "zero" by the previous write-in operation.

The cores are now primed or reset by pulses through wires **16*a*, 16*b* and 16*c* which create no change in the cores set to zero but which resets those cores which have been set to one but which were upset during the write-in period, as core 10*ab***, for example.

The constants are then read out by connecting the sensing wire 15 of each row in series for example. Thus the signal to amplifier A is obtained by connecting wires **15*aa*, 15*ab* and 15*ac* in series across the input to the amplifier A. The signal to amplifier B is obtained from series connected coils 15*ba*, 15*bb*, and 15*bc* while the signal to amplifier C is obtained from series connected coils 15*ca*, 15*cb* and 15*cc*. These signals are illustrated in FIG. 10 as A, B and C in which the pulses in lines 14*a*, 14*b* and 14*c*** produce the pulses as shown for lines A, B and C.

For rereading the constants at a later time, the core needs to be reset by a priming pulse through the wire 16 to establish the original condition of the flux distribution in the cores.

The priming pulse may come either before a constant is taken or after a constant is taken to prepare for a further readout of the stored constants.

It will be seen that the present invention does not require regulated current control since the absolute current pulse is not important. It is merely necessary to exceed a minimum current to insure saturation of the legs *b* and *c* in the proper direction.

Furthermore, negative pulses are never required for any phase of setting, resetting (priming) or readout.

Separate read and write circuits are not required, since the circuits are used for either read or write by correct timing of pulses. This will increase reliability and ease manufacture.

Simultaneous readout and write-in can be accomplished in the matrix by judicious timing of the prime pulses with respect to the driver pulses.

For example, consider the rows *a* and *b* in FIGURE 9 and suppose that the cores of row *a* are being readout while the cores of row *b* are to be simultaneously written into with a new constant, for example, 010. The first step is erasure of the constant in row *b* by an erase pulse in wire **13*b*** before the readout begins.

During the first driver pulse, through wire **14*a*, the output of core 10*aa* is sensed in wire 15*aa*. Simultaneously a pulse is applied to wire 16*b* since coincidence of the pulses in wires 14*a* and 16*b* writes in a zero on core 10*ba***.

During the second driver pulse, through wire **14*b*, the output of core 10*ab* is sensed in wire 15*ab*. No pulse is applied to wire 16*b* since coincidence of pulses would write in a zero on core 10*bb* while a "one" is required. It will be seen that the "one" condition had been set into core 10*bb* during the read pulse at wire 14*a* and is not destroyed by the pulse on wire 14*b***.

During the third driver pulse, through wire **14*c*, the output of core 10*ac* is sensed in wire 15*ac*. Simultaneously, a pulse is applied to wire 16*b* to write in a zero on core 10*bc*. It will be seen that although the core 10*bc* had been set to a one state by the earlier pulse in wire 16*b*** it will be set to a zero state by the coincident pulses.

It will be recognized that the only time prime pulses are required in the second row of cores is when a zero is to be written in. The one cores will be set automatically by the prime pulses during the zero write-in or just before a reading is taken if no zeros are to be stored.

In another matrix, the sensor coils 15 may all be connected in series across the input of a single amplifier. The horizontal gate is used to prime the particular row to be readout, the other rows being unprimed. A series of timed pulses in the vertical lines will induce outputs only from the primed cores set to one. The other cores in each column will not produce sensible outputs, and the noise contribution of some cores will substract from that of other cores resulting in only a small total noise output. Thus, the output of the amplifier will represent the constant stored in the row which was primed just prior to the start of the readout operation.

I claim:

1. The method of storing information in a magnetic memory device having a multiapertured ferrite core, a first wire threaded through one of said apertures, a second wire threaded through the same aperture as said first wire and also through a second aperture and a third wire threaded through said second aperture, comprising, erasing the core to a reversed state by a pulse through said first wire, setting in a constant by a pulse through said second wire, setting in a zero by pulses coincidentally through said second and third wires.

2. The method of storing information in a magnetic memory device having a ferrite core having at least first and second aperture therein, said apertures creating a first leg in said core between the outer edge of said core and said first aperture, a second leg between the outer edge of said core and said second aperture and a third leg between said first and second apertures, a first electrical conductor threaded through said first aperture, a second electrical conductor threaded through said second aperture and a third electrical conductor threaded through both of said apertures, means for setting up selected flux patterns in said core, said means including signal sources connected to each of said wires in specific sequence, said method including the step of erasing the existing magnetic state of said core by a current pulse in said first conductor to establish a continuous magnetic flux around said first aperture in one direction through said first leg and in the same direction in said second and third legs, and the step of reversing the direction of magnetic flux in all three three legs by simultaneous current pulses in said second and third conductors, the magnetic effects of said second and third electrical conductors cancelling each other around said second aperture.

3. The method of storing information in a magnetic memory device, a matrix of ferrite cores arranged in columns and rows, each of said ferrite cores having at least first and second apertures therein, said aperture creating a first leg in said core between the outer edge of said core and said first aperture, a second leg between the outer edge of said core and said second aperture and a third leg between said first and second apertures, first electrical conductors threaded through said first aperture of each core in each row or column, second electrical conductors threaded through said second aperture of each core in each column and third electrical conductors threaded through both of said apertures of each core in each row means for setting up selected flux patterns in said cores, said means including signal sources connected to each of said wires in specific sequence, said sequence including the step of erasing the existing magnetic state of all of said core by a current pulse in each of said first conductors to establish a continuous magnetic flux in each core around said first aperture in one direction through said first leg and in the same direction in said second and third legs of each core comprising, the step of reversing the direction of magnetic flux in said third leg of chosen cores but not in said second leg by a current pulse in said corresponding third or second conductor only, to produce a magnetic flux around said second aperture and the step of reversing the direction of magnetic flux in all three legs of the remaining cores by simultaneous current pulses in said second and third conductors of the corresponding cores, the magnetic effects of said second and third wires cancelling each other around said second aperture of each of said remaining cores.

4. The method of storing information in a magnetic memory device, a matrix of ferrite cores arranged in columns and rows, each of said ferrite cores having at least first and second apertures therein, said aperture creating a first leg in said core between the outer edge of said core and said first aperture, a second leg between the outer edge of said core and said second aperture and a third leg between said first and second apertures, first electrical conductors threaded through said first aperture of each core in each row or column, second electrical conductors threaded through said second aperture of each core in each column and third electrical conductors threaded through both of said apertures of each core in each row, means for setting up selected flux patterns in said cores, said means including signal sources connected to each of said wires in specific sequence, said sequence including the step of erasing the existing magnetic state of all of said core by a current pulse in each of said first conductors to establish a continuous magnetic flux in each core around said first aperture in one direction through said first leg and in the same direction in said second and third legs of each core, and the step of reversing the direction of magnetic flux in all three legs of chosen cores by simultaneous current pulses in said second and third conductors of the corresponding cores, the magnetic effects of said second and third wires cancelling each other around said second aperture of each of said chosen cores.

References Cited in the file of this patent

UNITED STATES PATENTS

| | | |
|---|---|---|
| 2,803,812 | Rajchman et al. | Aug. 20, 1957 |
| 2,884,622 | Rajchman | Apr. 28, 1959 |
| 2,911,630 | Dinowitz | Nov. 3, 1959 |